US012737466B2

(12) United States Patent
Preimesberger et al.

(10) Patent No.: US 12,737,466 B2
(45) Date of Patent: Sep. 15, 2026

(54) PROGRAM VERSION ENFORCEMENT USING A CERTIFICATE

(71) Applicant: HEWLETT PACKARD ENTERPRISE DEVELOPMENT LP, Spring, TX (US)

(72) Inventors: Lee A. Preimesberger, Houston, TX (US); Vartan Yosef Kasheshian, Houston, TX (US); Jonathan Rene Mooty, Houston, TX (US); Grant Tavis O'Connor, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 199 days.

(21) Appl. No.: 18/623,623

(22) Filed: Apr. 1, 2024

(65) Prior Publication Data

US 2025/0307407 A1 Oct. 2, 2025

(51) Int. Cl.

| | |
|---|---|
| ***G06F 21/57*** | (2013.01) |
| ***G06F 8/65*** | (2018.01) |
| ***H04L 9/00*** | (2022.01) |
| ***H04L 9/32*** | (2006.01) |

(52) U.S. Cl.

CPC .............. *G06F 21/572* (2013.01); *G06F 8/65* (2013.01); *H04L 9/006* (2013.01); *H04L 9/3268* (2013.01); *G06F 2221/033* (2013.01)

(58) Field of Classification Search

CPC .... G06F 21/572; G06F 2221/033; G06F 8/65; H04L 9/006; H04L 9/3268

See application file for complete search history.

(56) References Cited

U.S. PATENT DOCUMENTS

| | | | | |
|---|---|---|---|---|
| 10,003,467 | B1 * | 6/2018 | Miller | H04L 9/3268 |
| 2010/0011225 | A1 * | 1/2010 | Takayama | G06F 21/572 713/189 |
| 2021/0319139 | A1 * | 10/2021 | Ruan | G06F 21/602 |
| 2024/0118887 | A1 * | 4/2024 | Oh | G06F 8/71 |

* cited by examiner

*Primary Examiner* — Terrell S Johnson

(74) *Attorney, Agent, or Firm* — Trop, Pruner & Hu, P.C.

(57) ABSTRACT

An electronic device stores a target program representation containing information of a program for an electronic part of the electronic device. A controller obtains a certificate issued by a certificate authority, the certificate including a program version enforcement information element to indicate whether program version enforcement is to be applied using the target program representation. The controller checks the program version enforcement information element in the certificate to determine whether the program version enforcement is to be applied, and based on determining from the certificate that the program version enforcement is to be applied, the controller enforces application of a version of the program indicated by the target program representation to the electronic part.

20 Claims, 4 Drawing Sheets

PROGRAM VERSION ENFORCEMENT USING A CERTIFICATE

BACKGROUND

Electronic devices can be deployed in computing environments such as data centers, cloud computing environments, or other computing environments. Machine-readable instructions including firmware and software are executable in the electronic devices.

BRIEF DESCRIPTION OF THE DRAWINGS

Some implementations of the present disclosure are described with respect to the following figures.

Figure 1:
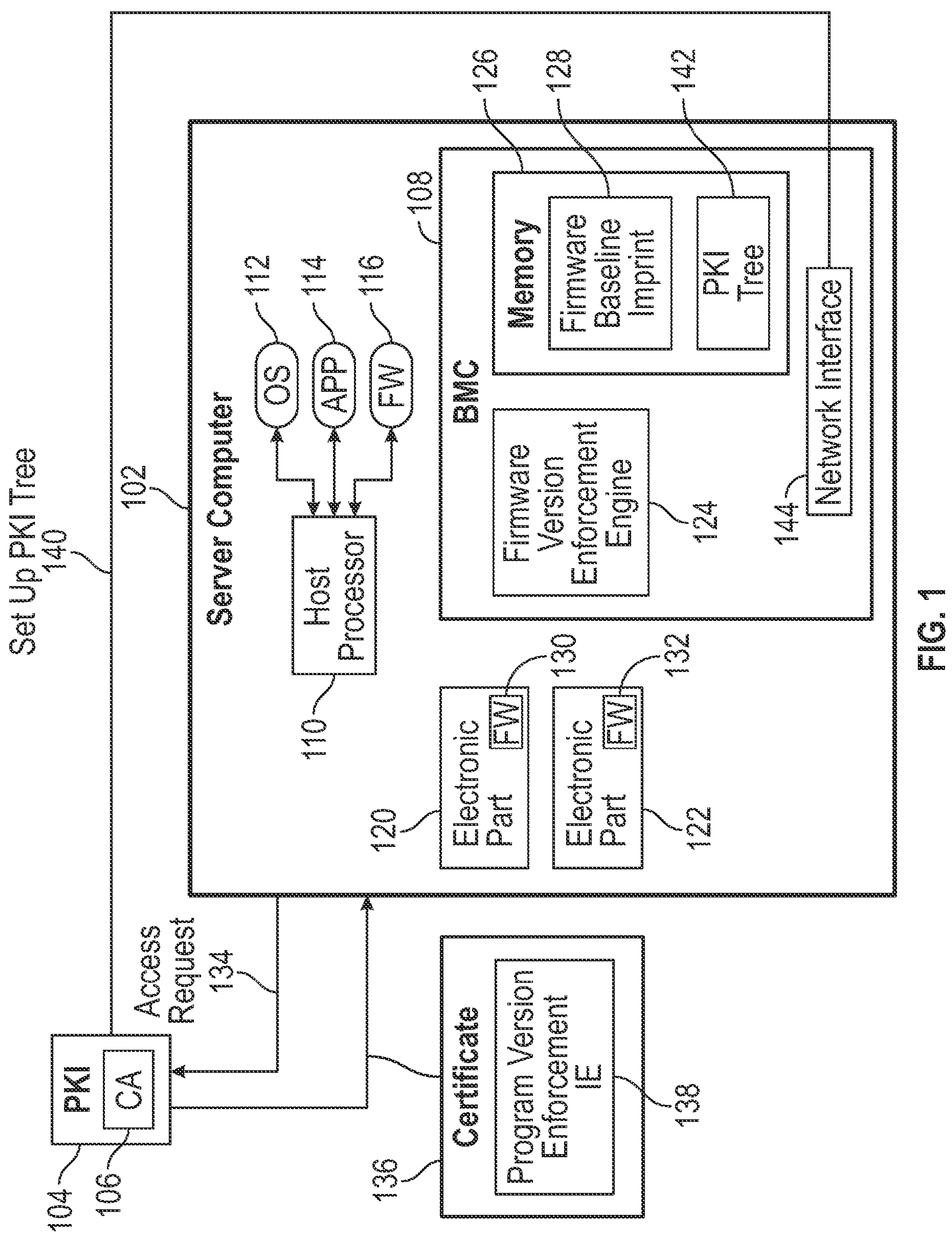
FIG. 1 is a block diagram of an arrangement that includes a server computer and a public key infrastructure (PKI) including a certificate authority (CA), in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An electronic device can include various electronic parts that can execute machine-readable instructions, including programs such as firmware and/or software. An "electronic part" can refer to any hardware device that includes processing circuitry capable of executing programs. Examples of electronic parts include network interface controllers (NICs), graphics controllers, input/output (I/O) devices, storage devices, memory devices, management controllers, or other types of hardware devices.

When an electronic device is initially configured, such as during manufacture, assembly, or at any other stage, various programs are installed in the electronic device for the electronic parts of the electronic device. The versions of the installed programs when the electronic device was initially configured are referred to as "baseline versions" of the installed programs. Over time, later versions of the programs for the electronic parts may be released. When a given electronic part of the electronic device is replaced, upgraded, or repaired in the field (e.g., at the location where the electronic device is deployed or at a repair facility), the replaced, upgraded, or repaired electronic part (referred to as a "modified electronic part") may be updated with the latest version of the program for the given electronic part.

However, a user or other entity associated with the given electronic part may have designated a specific version (e.g., the baseline version) of the program to be used with the given electronic part at the time of the initial configuration of the electronic device. For example, the given electronic part may have been tested and qualified using the baseline version (or other specified version) of the program for the given electronic part. Updating the program to a new version (or more generally, a different version) when the given electronic part is modified may cause the given electronic part to no longer function as expected, which results in an out-of-specification condition. The new version of the program executed on the given electronic part may lead to errors in the electronic device or may even cause physical damage in the electronic device, such as when the new version of the program causes the given electronic part to exceed a power cap imposed on the given electronic device.

A further issue relates to an order in which programs are applied to electronic parts of the electronic device. During manufacture, assembly, or at another initial stage of the electronic device, programs (e.g., firmware) are applied to the electronic parts in a specific order. Applying a program to an electronic part refers to loading the program for execution by the electronic part. As an example, firmware may first be applied to a management controller (e.g., a baseboard management controller or BMC) of the electronic device, followed by applying firmware to the NIC and/or other electronic parts of the electronic device. During electronic part replacement, upgrade, or repair in the field, the firmware may be applied in a different order to the electronic parts of the electronic device, which can lead to different outcomes. For example, if the firmware is not first applied to the management controller, the features of the management controller may not be available during startup of the electronic device, which can lead to errors or unexpected operations.

In accordance with some implementations of the present disclosure, a certificate issued by a certificate authority is used to indicate that program version enforcement is to be applied using a target program representation that contains version information indicating versions of programs for respective electronic parts of an electronic device. Enforcing a specific program version for a given electronic part refers to ensuring that a program installed in the given electronic part is of the specific program version.

In examples where the programs include firmware for the respective electronic parts, the target program representation can be referred to as a "firmware baseline imprint" to enforce specific versions of firmware for the respective electronic parts. A controller (e.g., a management controller such as a BMC) in the electronic device checks the certificate to determine whether the target program representation is present. Based on determining from the certificate that the target program representation is present, the controller enforces application of the version of the program indicated by the target program representation to the electronic part. Techniques or mechanisms according to some implementations of the present disclosure provide for certificate-based enforcement of program versions for electronic parts in an electronic device.

The target program representation can be in the form of a data structure that can include one or more files, objects, or other data elements. In the ensuing discussion, reference is made to enforcing firmware for electronic parts using certificates. However, more generally, certificates can be used to enforce versions of any other types of programs for electronic parts.

Examples of electronic devices can include computers such as server computers, desktop computers, notebook computers and tablet computers; storage systems; communication nodes; vehicles; or other types of electronic devices.

A "certificate" can refer to information that is used to secure communications, such as between an access device and a target electronic device. In some examples, certificates can be X.509 certificates according to the X.509 protocol, which is provided by the International Telecommunication Union (ITU) and defines the format of public key certificates. An X.509 certificate binds an identity to a public key using a digital signature. A certificate contains an identity (a hostname, or an identity of an organization or an individual) and a public key, and the certificate can be signed by a certificate authority (CA). A certificate is signed by a trusted CA, the certificate to verify that the content of the certificate can be trusted.

In accordance with some implementations of the present disclosure, a certificate contains a program version enforcement information element (IE) to indicate that enforcement of program versions for electronic parts are to be performed using a target program representation. In some examples of the present disclosure, a certificate such as an X.509 certificate is extended to add program version enforcement metadata in the form of object identifier (OID) metadata according to X.509, for example. The program version enforcement metadata can include a value of an OID, for example, that specifies whether the target program representation is present. The program version enforcement IE if set to a first value (e.g., "0" or another value) indicates that program version enforcement is not to be applied using a target program representation. However, the program version enforcement IE if set to a different second value (e.g., "1" or another value) indicates that program version enforcement is to be applied using a target program representation.

More specifically, an X.509 certificate includes an Extensions field, which is a sequence of one or more certificate extensions. Each certificate extension has its own unique identifier, expressed as an OID. An OID includes a set of values. In some examples of the present disclosure, one or more values of an OID can be used as a program version enforcement IE.

FIG. 1 is a block diagram of an example arrangement that includes a server computer 102 and a public key infrastructure (PKI) 104. The server computer 102 is an example of an electronic device with electronic parts for which program versions (and more specifically, firmware versions) are to be enforced.

The PKI 104 is an example of a system (implemented with one or more computers) that manages the issuance of certificates and the binding of electronic devices, such as the server computer 102, to a security key hierarchy (e.g., a PKI tree), to enable selective enforcement of firmware versions for electronic parts. The PKI 104 includes a certificate authority (CA) 106 that issues certificates.

Although just one server computer 102 is depicted in FIG. 1, it is noted that there may be multiple server computers or other target electronic devices. For example, a facility (such as a data center or another type of facility) can include a large quantity of electronic devices.

The server computer 102 includes a baseboard management controller (BMC) 108 and a host processor (or multiple host processors) 110. The BMC 108 is an example of a management controller of the server computer 102 that is able to perform management tasks associated with the server computer 102.

As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on one or more hardware processing circuits.

The host processor 110 is part of the processing resource of the server computer 102. The host processor 110 executes primary machine-readable instructions of the server computer 102, such as an operating system (OS) 112, an application program 114, system firmware 116, or other software or firmware. A processor can include a microprocessor, a core of a multi-core microprocessor, a microcontroller, a programmable integrated circuit, a programmable gate array, or another hardware processing circuit.

The system firmware 116 can include Basic Input/Output System (BIOS) code or Universal Extensible Firmware Interface (UEFI) code, for example. "Primary" machine-readable instructions are distinct (and separate) from machine-readable instructions (such as firmware or software) executable by other electronic components (separate from the host processor 110). The primary machine-readable instructions may be stored in a storage medium (not shown in FIG. 1)

The server computer 102 includes electronic parts 120 and 122. The electronic part 120 can execute firmware 130, and the electronic part 122 can execute firmware 132. A firmware version enforcement engine 124 of the BMC 108 is able to apply certificate-based firmware version enforcement of the firmware 130 and 132 in the respective electronic parts 120 and 122.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In the example of FIG. 1, the firmware version enforcement engine 124 can be implemented with a portion of the hardware processing circuitry of the BMC 108, or with machine-readable instructions executed by the BMC 108. Alternatively, the firmware version enforcement engine 124 may be separate from the BMC 108.

Although FIG. 1 depicts two electronic parts in the server computer 102 for which certificate-based firmware version enforcement is applied, in other examples, the certificate-based firmware version enforcement can be applied to a different quantity (1 or greater than 1) of electronic parts in the server computer 102.

The certificate-based firmware version enforcement applied by the firmware version enforcement engine 124 is based on using a firmware baseline imprint 128 if present in a memory 126 of the BMC 108. The firmware baseline imprint 128 contains information identifying versions of the firmware 130 and 132 that are to be included in the electronic parts 120 and 122. If the electronic part 120 or 122 were to be replaced, upgraded, or repaired (such an electronic part is referred to as a "modified electronic part"), the firmware loaded into the modified electronic part would be according to the version specified in the firmware baseline imprint 128. Thus, even if a newer version of the firmware for the modified electronic part is available, the firmware version enforcement engine 124 would ensure that the firmware version loaded into the modified electronic part is the version specified in the firmware baseline imprint 128 and not the newer version (or more generally, another version).

In some examples, the firmware baseline imprint 128 includes a package including firmware and associated metadata for the electronic parts 120, 122. For example, the firmware baseline imprint 128 can include a first firmware and metadata for the electronic part 120, a second firmware and metadata for the electronic part 122, and so forth. In other examples, instead of including firmware for the electronic parts 120, 122 in the firmware baseline imprint 128, the firmware baseline imprint 128 can include location information to identify where the firmware can be obtained. For example, the location information can include a Uniform Resource Locator (URL) of a resource containing the firmware. Alternatively, the location information includes a storage address of a storage location in a storage system at which the firmware is stored.

In more specific examples, the package can include a JavaScript Object Notation (JSON) Web Token (JWT) package, a ZIP package, or any other type of package including one or more files, such as JSON files, extensible Markup Language (XML) files, or any other data elements.

The metadata can include version information that identifies a respective version of each firmware in the firmware baseline imprint 128. Additionally, the metadata may include settings to be applied to the electronic parts 120, 122 or the server computer 102. Examples of settings can include one or more of the following: a firmware setting for the electronic parts (e.g., an order in which firmware of components including the electronic parts are to be applied), an encryption setting for an electronic part (specifying whether encryption is to be applied for data of the electronic part), a hardware setting for an electronic part (e.g., a setting specifying how hardware of the electronic part is to be configured), a cooling setting for an electronic part (a setting indicating if and how cooling is to be provided for the electronic part), a virtualization setting for an electronic part (a setting indicating whether virtualization is implemented in the electronic part), a power management setting (a setting indicating power management for the electronic part), or any other setting.

The firmware version enforcement engine 124 makes a determination of whether firmware version enforcement is to be applied using the firmware baseline imprint 128 in the memory 126 based on a certificate obtained from the CA 106. For example, the server computer 102 can send an access request 134 to the CA 106, which responds with a certificate 136. The certificate 136 includes a program version enforcement IE 138 for indicating that firmware versions for electronic parts are to be enforced using the firmware baseline imprint 128. Stated another way, the program version enforcement IE 138 in the certificate 136 can indicate that the firmware baseline imprint 128 (or more generally, a target program representation) is present in the server computer 102 and is to be used.

In some examples of the present disclosure, the PKI 104 can set up (at 140) a PKI tree 142 in the BMC 108. The PKI tree 142 can be provided from the PKI 104 over a management network to the BMC 108. The BMC 108 includes a network interface 144 that is connected to the management network. The management network to which the BMC 108 is connected is an example of an out-of-band communication link that is separate from a primary network to which a network interface (not shown) of the server computer 102 is connected. The primary network is used by the server computer 102, such as by primary machine-readable instructions executed in the server computer 102, to perform network communications.

The PKI tree 142 can be stored in the memory 126. Setting up the PKI tree 142 in the BMC 108 binds the PKI tree 142 to the server computer 102. Once the PKI tree 142 is installed in the BMC 108, the firmware version enforcement engine 124 can enforce firmware versions in the electronic parts 120 and 122 based on certificates provided to the BMC 108 by external entities, such as the CA 106. The certificates can be generated by the CA 106 based on keys that are represented in the PKI tree 142.

The PKI tree 142 includes a hierarchical arrangement of nodes that represent different entities, including users, user groups, devices, or other entities. Each node is associated with a key that is assigned to the entity. A key in the PKI tree 142 can include a public-private key pair that has a public key and the corresponding private key.

The PKI tree 142 is an example of a security key hierarchy (including a hierarchical arrangement of keys) that can be bound to an electronic device (or more generally, to a collection of target electronic devices) for which firmware version enforcement is to be applied. As used here, a "collection" of items can refer to a single item or multiple items. Thus, a collection of electronic devices can refer to a single electronic device or multiple electronic devices.

Figure 2:
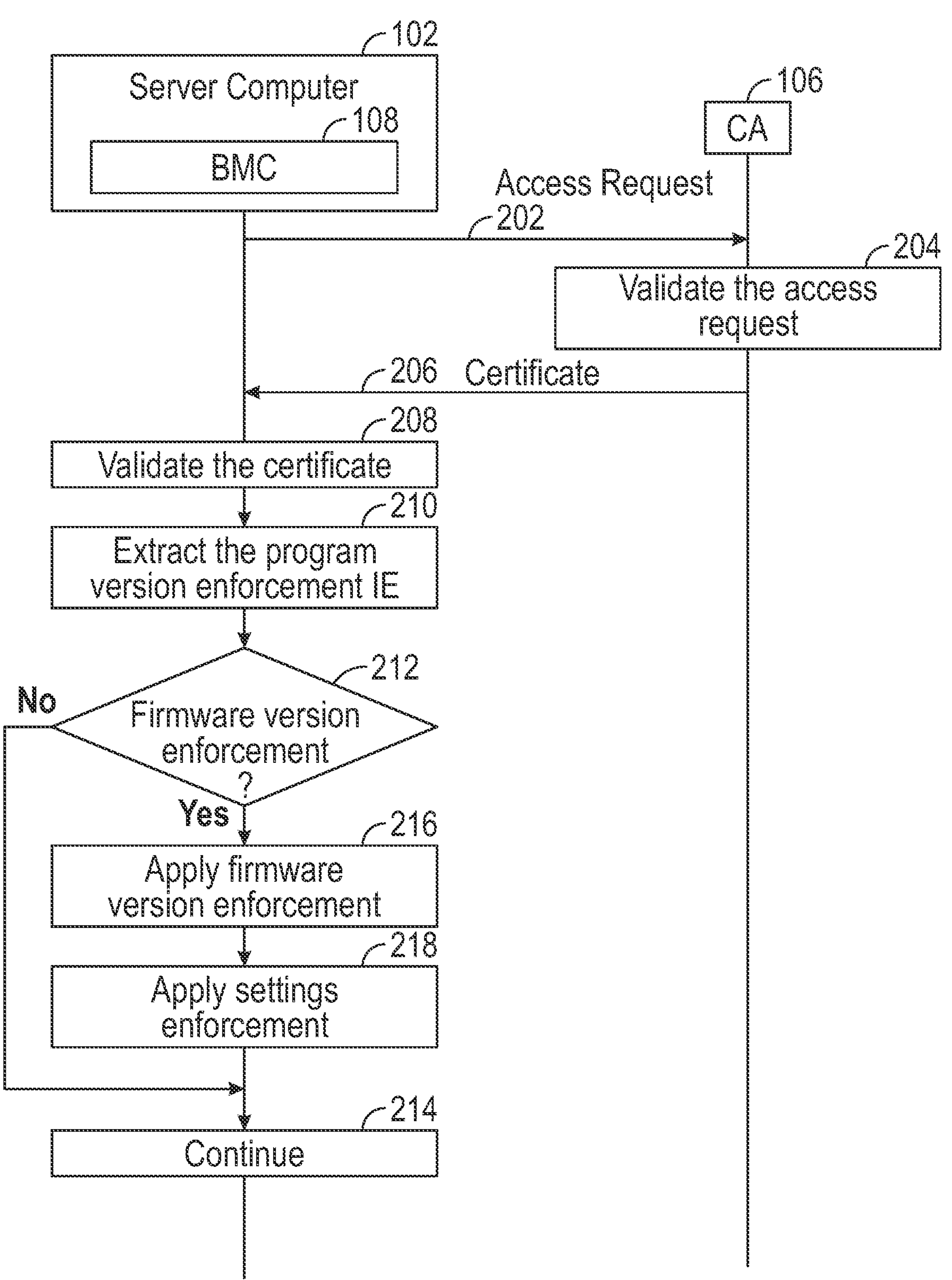
FIG. 2 is a flow diagram of a process of certificate-based program version enforcement for a server computer, according to some examples.

The following discussion refers to both FIG. 1 and FIG. 2. FIG. 2 is a flow diagram of a process of providing certificate-based firmware version enforcement for the electronic parts 120 and 122 of the server computer 102, in accordance with some examples of the present disclosure. In other examples, the tasks of the process can be performed in a different order from that depicted in FIG. 2, additional tasks may be added, and some tasks may be omitted.

In some examples, the process of FIG. 2 may be triggered by the server computer 102 when an event occurs that would cause an installation of a firmware into a given electronic part (120 or 122) (or modified electronic parts). For example, the electronic part may have been replaced, upgraded, or repaired, which may trigger a re-installation of the firmware. An operator of the server computer 102 may specify that a specific version of the firmware be used for the electronic part, and not another version such as the latest version of the firmware. To determine whether installation of a specific firmware version is to be enforced, the server computer 102 obtains a certificate from the CA 106.

The process of FIG. 2 can be performed when the server computer 102 (or more specifically, the BMC 108) is booted. Performing the process of FIG. 2 during the boot of the BMC 108 prevents an incorrect version of firmware from being installed in an electronic part. The process of FIG. 2 may be performed responsive to an indication that firmware has been re-installed in at least one electronic part of the server computer 102. The indication may be part of a request from a user or another entity to perform the process of FIG. 2. Alternatively, the indication may be in the form of a flag that is persistently stored, such as by the system firmware 116 or the OS 112, indicating that the firmware has been re-installed in at least one electronic part.

The server computer 102 can send (at 202) the access request 134 to the CA 106 over a network to obtain the certificate. In some examples, the BMC 108 can send the access request 134 through the network interface 144 of the BMC 108 over the management network to the CA 106. In other examples, the server computer 102 can send the access request 134 to the CA 106 over a primary network connection.

The access request 134 can include a certificate signing request (CSR), which is a request that seeks the issuance of a certificate. The CSR can contain a public key of the server computer 102.

In response to the CSR, the CA 106 validates (at 204) the CSR. For example, the CSR may be signed by the server computer 102 using a private key. The CA 106 is able to successfully validate the CSR if the CSR is signed using a valid private key. In response to successful validation of the CSR, the CA 106 issues the certificate 136 that is sent (at 206) from the CA 106 back to the server computer 102.

In accordance with some examples of the present disclosure, the CA 106 adds the program version enforcement IE 138 into the certificate 136. The program version enforcement IE 138 may be part of an OID of the certificate 136, for example. The program version enforcement IE 138 can be set to one of several different values, which can specify whether or not firmware version enforcement is to be applied.

In other examples, instead of the server computer 102 sending the access request 134 to the CA 106, another device can send the access request 134 to the CA 106, which responds by sending the certificate 136 to the other device. The other device can in turn send the certificate 136 to the server computer 102.

In some examples, the certificate 136 from the CA 106 is received by the BMC 108. The certificate 136 from the CA 106 may be signed using a private key of the CA 106 or another entity. The firmware version enforcement engine 124 can validate (at 208) the certificate 136, such as by using a public key (e.g., the CA's public key or the public key of another entity) to decrypt the signed certificate 136. The public key used to validate the certificate 136 can be obtained by the firmware version enforcement engine 124 from the PKI tree 142.

If the certificate 136 is validated, the firmware version enforcement engine 124 extracts (at 210) the program version enforcement IE 138 from the certificate 136. Based on the value assigned to the program version enforcement IE 138, the firmware version enforcement engine 124 determines (at 212) whether to apply firmware version enforcement using the firmware baseline imprint 128.

If the program version enforcement IE 138 is set to a first value (e.g., "0" or another value) (the "No" branch from the decision block 212), the firmware version enforcement engine 124 does not apply firmware version enforcement and the server computer 102 continues (at 214) to other tasks. However, if the program version enforcement IE 138 is set to a different second value (e.g., "1" or another value) (the "Yes" branch from the decision block 212), the firmware version enforcement engine 124 applies (at 216) firmware version enforcement using the firmware baseline imprint 128.

To apply the firmware version enforcement, the firmware version enforcement engine 124 retrieves the firmware baseline imprint 128 from the memory 126 to determine which version of the firmware should be installed in an electronic part for which an installation of a firmware was triggered due to an event (e.g., a replacement, upgrade, or repair of the electronic part). If the version of the firmware installed in the electronic part is different from the specified version of the firmware for the electronic part in the firmware baseline imprint 128, the firmware version enforcement engine 124 can take action to restore the firmware in the electronic part to the specified version. For example, if the firmware baseline imprint 128 includes the firmware for the electronic part, the firmware version enforcement engine 124 re-installs the firmware from the firmware baseline imprint 128 to the electronic part. In another example, the firmware baseline imprint 128 may refer to a location (e.g., using a URL or storage address) where the correct version of firmware for the electronic part is available, in which case the firmware version enforcement engine 124 can retrieve the firmware for the electronic part at the location to re-install the retrieved firmware in the electronic part.

In some examples, the firmware baseline imprint 128 can be signed using a private key of a user or another entity that created the firmware baseline imprint 128. For example, the firmware baseline imprint 128 may be loaded by a manufacturer of the server computer 102 at the time of manufacture of the server computer 102. In other examples, the firmware baseline imprint 128 can be installed in the server computer 102 at a different time, such as by a user, downloaded from a remote source, or by another entity. If the firmware baseline imprint 128 is signed, the firmware version enforcement engine 124 can retrieve a corresponding public key from the PKI tree 142 to decrypt the signed firmware baseline imprint 128. If the firmware version enforcement engine 124 is able to successfully decrypt the signed firmware baseline imprint 128, then the firmware version enforcement engine 124 can confirm that the firmware baseline imprint 128 is authentic and can be trusted.

In some examples, a firmware in the firmware baseline imprint 128 is also signed, such as by the manufacturer of the electronic part ("electronic part manufacturer") on which the firmware is to execute. To access the firmware in the firmware baseline imprint 128, the firmware version enforcement engine 124 can retrieve a corresponding key of the electronic part manufacturer form the PKI tree 142 to decrypt the signed firmware. If the signed firmware can be successfully decrypted, then the firmware version enforcement engine 124 can confirm that the firmware is authentic.

In the above examples, the firmware in the firmware baseline imprint 128 is signed, and the firmware baseline imprint 128 itself is signed. This results in double signing of the firmware-related information for the electronic parts 120, 122 of the server computer 102. Double signing the firmware-related information provides greater security to ensure that firmware installed from the firmware baseline imprint 128 into an electronic part is not corrupted or compromised.

In addition to applying firmware version enforcement (at 216), the firmware version enforcement engine 124 also applies (at 218) settings enforcement using the firmware baseline imprint 128. As noted above, the firmware baseline imprint 128 can include metadata specifying settings for the electronic parts 120, 122 of the server computer 102.

The settings can include a firmware setting that specifies an order in which firmware is to be applied to components in the server computer 102. For example, the firmware order can include first installing and executing firmware of the BMC 108 before installing and executing firmware of other components including the electronic parts 120, 122. In an example, the firmware order can prevent a user in the field from first installing firmware into one or more electronic parts 120, 122 before installing firmware into the BMC 108. Installing firmware out of order can cause errors or unexpected operations.

The settings in the firmware baseline imprint 128 can include other settings, noted further above. The firmware version enforcement engine 124 retrieves the settings from the firmware baseline imprint 128 and confirms that any settings applied to components in the server computer 102, including the electronic parts 120, 122, are according to the settings specified by the firmware baseline imprint 128. Any setting used that is inconsistent with the specified settings will trigger the firmware version enforcement engine 124 to re-apply the specified settings.

As noted above, the firmware baseline imprint 128 can represent an initial configuration associated with the electronic parts 120, 122 at the time of manufacture or at another stage. In some examples, at a later time, the firmware baseline imprint 128 can be updated, such as by a user (e.g., an administrator) associated with the server computer 102, by the manufacturer, or by another entity. The updated firmware baseline imprint 128 can include an updated firmware that can be a different version from an initial base line version. The updated version is considered an updated baseline version. Settings in the updated firmware baseline imprint 128 can also be modified.

The entity providing the updated firmware baseline imprint 128 to the server computer 102 can sign the updated firmware baseline imprint 128 using a private key of the entity. Once the BMC 108 receives the signed, updated firmware baseline imprint 128, the BMC 108 can validate the signed, updated firmware baseline imprint 128 using a corresponding public key for the entity, where the corresponding public key can be retrieved from the PKI tree 142 in the memory 126. The updated firmware baseline imprint 128 can be provided to the BMC 108 over the management network connected to the BMC 108. For example, a user at a user device (e.g., a computer, a smartphone, etc.) can request an upload of the updated firmware baseline imprint 128 to the BMC 108. In some examples, the user device can also read an installed firmware baseline imprint 128 that is stored in the memory 126 of the BMC 108.

Figure 3:
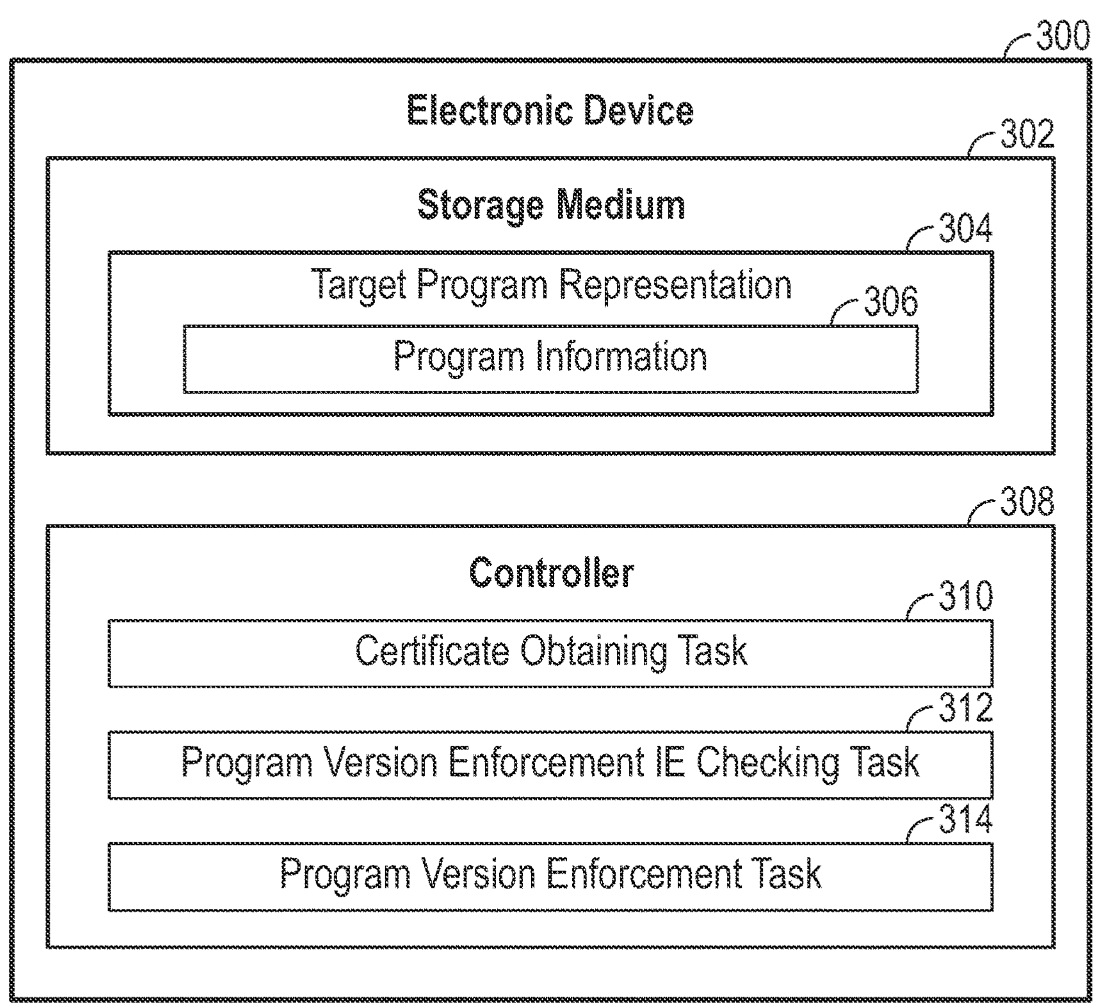
FIG. 3 is a block diagram of an electronic device according to some examples.

FIG. 3 is a block diagram of an electronic device 300. An example of the electronic device 300 is the server computer 102 of FIG. 1. In other examples, the electronic device 300 is another type of electronic device.

The electronic device 300 includes a storage medium 302 storing a target program representation 304 containing information 306 of a program for an electronic part of the electronic device 300. In some examples, the target program representation 304 contains information for one program for one electronic part. In other examples, the target program representation 304 contains information for multiple programs for respective multiple electronic parts. An example of the target program representation 304 is the firmware baseline imprint 128 of FIG. 1. The program(s) for which the target program representation 304 contains information can include firmware or software. The storage medium 302 can include a memory and/or another type of storage device.

The electronic device 300 further includes a controller 308, which can include a management controller according to some examples. A specific example of a management controller is a BMC. The controller 308 can perform various tasks, such as tasks performed by the hardware processing circuitry of the controller 308, or tasks performed by machine-readable instructions executed by the controller 308.

The tasks of the controller 308 include a certificate obtaining task 310 to obtain a certificate issued by a CA (e.g., 106 in FIG. 1). The certificate includes a program version enforcement IE to indicate whether program version enforcement is to be applied using the target program representation 304. The certificate can be obtained by the controller 308 in response to the controller 308 sending an access request (e.g., a CSR) to the CA. Alternatively, the certificate can be obtained by the controller 308 from another device that obtained the certificate from the CA.

The tasks of the controller 308 include a program version enforcement IE checking task 312 to check the program version enforcement IE in the certificate to determine whether the program version enforcement is to be applied. The controller 308 can check a value of the program version enforcement IE. If the program version enforcement IE is set to a first value, program version enforcement is not to be applied. However, if the program version enforcement IE is set to a different second value, program version enforcement is to be applied by the controller 308.

The tasks of the controller 308 include a program version enforcement task 314 to, based on determining from the certificate that the program version enforcement is to be applied, enforce application of a version of the program indicated by the target program representation to the electronic part. In some examples, the controller 308 determines whether an installed version of the program for the electronic part is consistent with the version of the program identified by the target program representation 304. Based on determining that the installed version of the program for the electronic part is not consistent with the version of the program identified by the target program representation, the controller 308 replaces the installed version of the program with the version of the program identified by the target program representation 304. On the other hand, based on determining that the installed version of the program for the electronic part is consistent with the version of the program identified by the target program representation, the controller 308 takes no further action with respect to the program installed in the electronic part.

In some examples, the target program representation comprises version information identifying the version of the program.

In some examples, the target program representation further includes the program according to the version of the program identified by the target program representation. The controller 308 replaces the installed version of the program with the version of the program identified by the target program representation by extracting the program from the target program representing and installing the extracted program in the electronic part.

In some examples, the target program representation comprises version information identifying versions of programs for respective electronic parts of the electronic device 300.

In some examples, the check of the program version enforcement information is performed during a boot of the electronic device 300.

In some examples, the controller 308 validates the certificate based on confirming that the certificate is signed by a private key of an authorized entity. In some examples, the controller 308 validates the certificate by using a public key from a security key hierarchy (e.g., the PKI tree 142 of FIG. 1) stored in a memory of the electronic device 300.

In some examples, the target program representation includes a setting associated with the electronic part. The controller 308 enforces an application of the setting with respect to the electronic part.

In some examples, the controller 308 determines whether a current setting associated with the electronic part is consistent with the setting in the target program representation 304. In response to determining that the current setting associated with the electronic part is not consistent with the setting in the target program representation 304, the controller 308 replace the current setting associated with the electronic part with the setting in the target program representation 304.

In some examples, the controller 308 receives an updated target program representation that indicates a different version of the program for the electronic part. The controller 308 stores the updated target program representation in the storage medium 302.

In some examples, the target program representation 304 is signed, and the controller 308 validates the target program representation 304 using a first key from a security key hierarchy stored in a memory of the electronic device.

In some examples, the program is also signed, and the controller 308 validates the program using a second key from the security key hierarchy.

Figure 4:
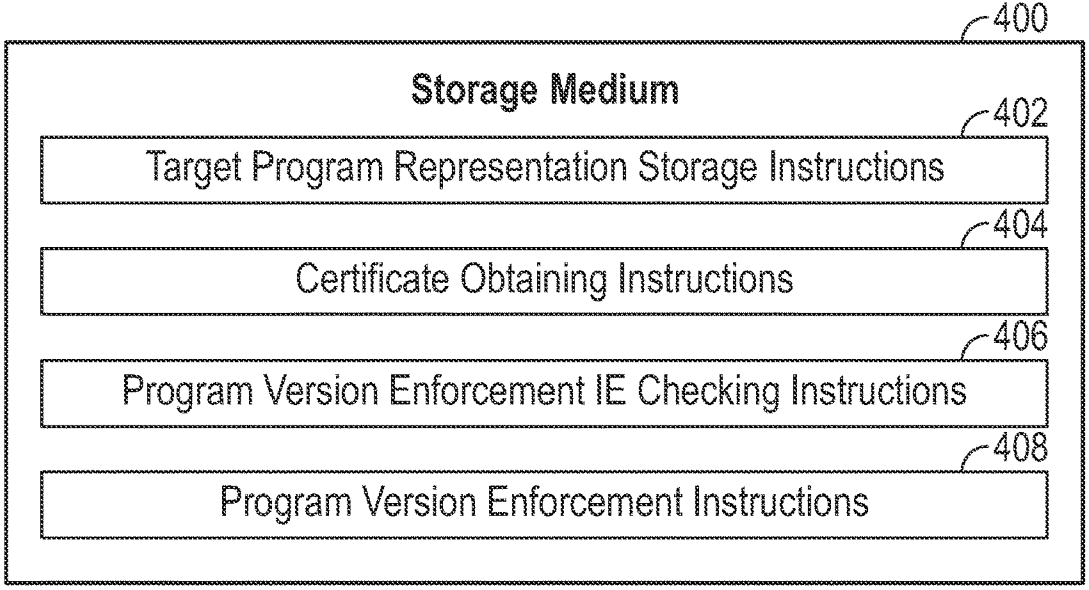
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a controller to perform various tasks. The controller may be the BMC 108 of FIG. 1, for example.

The machine-readable instructions include target program representation storage instructions 402 to store a target program representation in a storage medium. The target program representation includes program version information identifying a program version for a program of an electronic part in an electronic device. An example of the target program representation is the firmware baseline imprint 128 of FIG. 1.

The machine-readable instructions include certificate obtaining instructions 404 to obtain a certificate issued by a CA. The certificate includes a program version enforcement IE to indicate whether program version enforcement is to be applied using the target program representation.

The machine-readable instructions include program version enforcement IE checking instructions 406 to check the program version enforcement IE in the certificate to determine whether the program version enforcement is to be applied.

The machine-readable instructions include program version enforcement instructions 408 to, based on determining from the certificate that the program version enforcement is to be applied, enforce application of a version of the program identified by the target program representation to the electronic part. The enforcement is accomplished by checking whether an installed version of the program in the electronic part is consistent with the program version identified by the target program representation, and if not, to replace the installed version with the program version identified by the target program representation.

Figure 5:
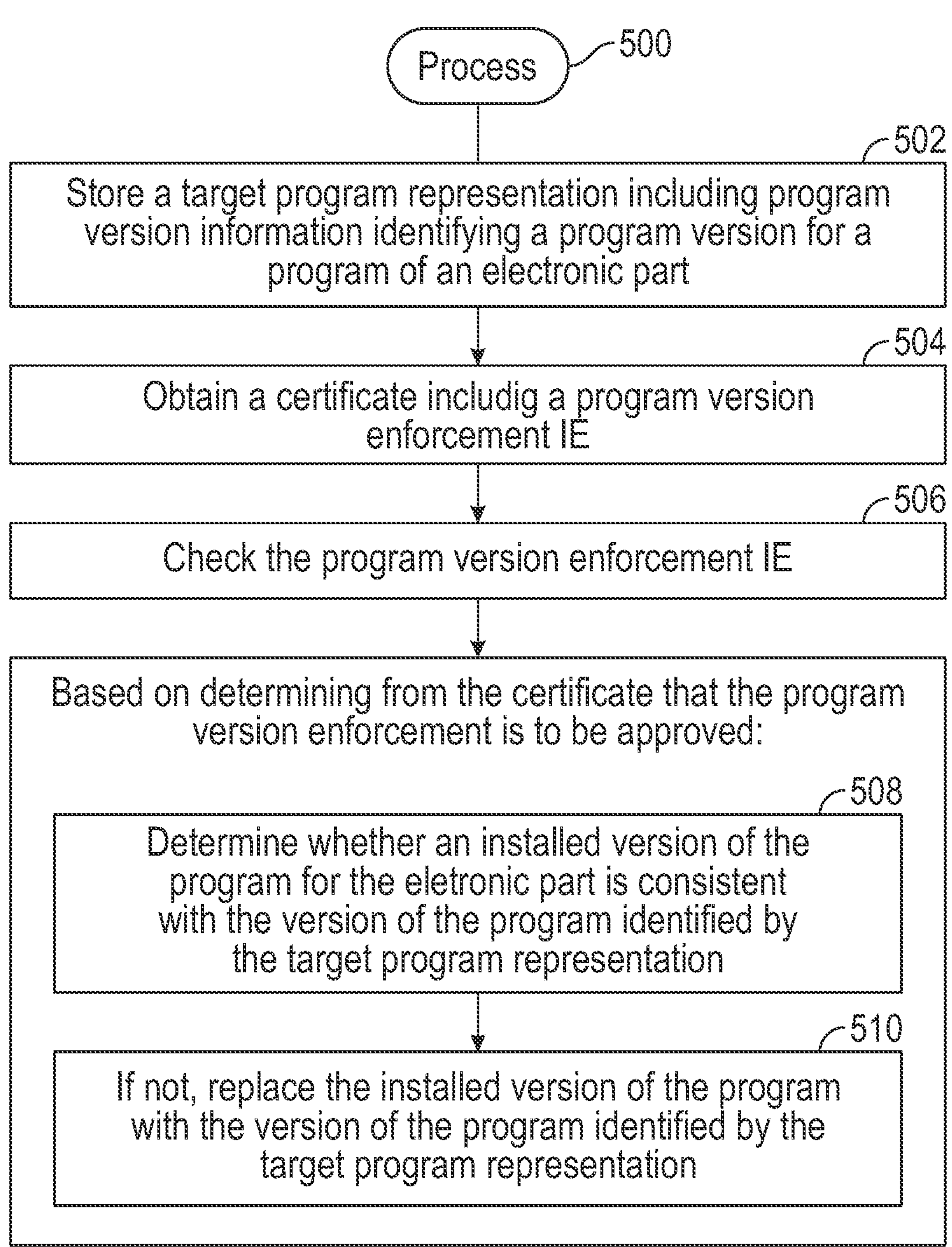
FIG. 5 is a flow diagram of a process according to some examples.

FIG. 5 is a flow diagram of a process 500 according to some examples of the present disclosure. The process 500 may be performed by a BMC, for example.

The process 500 includes storing (at 502) a target program representation in a storage medium, the target program representation including program version information identifying a program version for a program of an electronic part in an electronic device. The target program representation may be stored in the electronic device during an initial configuration of the electronic device, for example. Alternatively, the target program representation may be stored in the electronic device after deployment in the field for use.

The process 500 includes obtaining (at 504) a certificate issued by a CA, the certificate including a program version enforcement IE to indicate whether program version enforcement is to be applied using the target program representation.

The process 500 includes checking (at 506) the program version enforcement IE in the certificate to determine whether the program version enforcement is to be applied. The checking involves determining if the program version enforcement IE has a first value or a second value.

The process 500 includes, based on determining from the certificate that the program version enforcement is to be applied, determining (at 508) whether an installed version of the program for the electronic part is consistent with the version of the program identified by the target program representation, and based on determining that the installed version of the program for the electronic part is not consistent with the version of the program identified by the target program representation, replacing (at 510) the installed version of the program with the version of the program identified by the target program representation.

A "BMC" (e.g., the BMC 108 of FIG. 1) can refer to a specialized service controller that monitors the physical state of an electronic device using sensors and communicates with a remote management system (that is remote from the electronic device) through an independent "out-of-band" connection through a network interface of the BMC. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access to the electronic device (to access the electronic device over a network, for example), remote reboot of the electronic device (to trigger the computer system to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a host processor, a memory, an input/output (I/O) device, etc.) of the electronic device.

A storage medium (e.g., 302 in FIG. 3 or 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:

a storage medium storing a target program representation comprising version information identifying a version of a program for an electronic part of the electronic device; and a controller to:

obtain a certificate issued by a certificate authority, the certificate separate from the target program representation and comprising a program version enforcement information element (IE) to indicate whether program version enforcement is to be applied using the target program representation;

check the program version enforcement IE in the certificate to determine whether the program version enforcement is to be applied, wherein the program version enforcement IE if set to a first value indicates that the program version enforcement is not to be applied using the target program representation, and the program version enforcement IE if set to a second value indicates that the program version enforcement is to be applied using the target program representation; and based on determining from the certificate that the program version enforcement is to be applied responsive to the program version enforcement IE in the certificate being set to the second value, enforce application of the version of the program identified by the version information to the electronic part.

2. The electronic device of claim 1, wherein the target program representation is stored in the storage medium at a time of manufacture of the electronic device, and the certificate is obtained based on the controller sending an access request to the certificate authority.

3. The electronic device of claim 1, wherein the controller is to:

determine whether an installed version of the program for the electronic part is consistent with the version of the program identified by the version information.

4. The electronic device of claim 3, wherein the controller is to:

based on determining that the installed version of the program for the electronic part is not consistent with the version of the program identified by the version information in, replace the installed version of the program with the version of the program identified by the version information.

5. The electronic device of claim 4, wherein the target program representation further comprises the program according to the version of the program identified by the version information, and wherein the replacing of the installed version of the program with the version of the program identified by the version information comprises extracting the program from the target program representation and installing the extracted program in the electronic part.

6. The electronic device of claim 1, wherein the controller is to:

obtain a second certificate issued by the certificate authority for a second program for a second electronic part of the electronic device, the second certificate comprising a program version enforcement IE set to the first value to indicate that program version enforcement for the second program is not to be applied using the target program representation; and based on determining from the second certificate that the program version enforcement for the second program is not to be applied responsive to the program version enforcement IE in the second certificate being set to the first value, decline to use the target program representation for the second program.

7. The electronic device of claim 1, wherein the check of the program version enforcement IE in the certificate is performed during a boot of the electronic device.

8. The electronic device of claim 1, wherein the controller is to:

validate the certificate based on confirming that the certificate is signed by a private key of an authorized entity.

9. The electronic device of claim 8, wherein the controller is to validate the certificate by using a public key from a security key hierarchy stored in a memory of the electronic device.

10. The electronic device of claim 6, wherein the target program representation further comprises version information identifying a version of the second program for the second electronic part.

11. The electronic device of claim 1, wherein the target program representation comprises a setting associated with the electronic part, and wherein the controller is to:

enforce an application of the setting with respect to the electronic part.

12. The electronic device of claim 11, wherein the controller is to:

determine whether a current setting associated with the electronic part is consistent with the setting in the target program representation; and in response to determining that the current setting associated with the electronic part is not consistent with the setting in the target program representation, replace the current setting associated with the electronic part with the setting in the target program representation.

13. The electronic device of claim 11, wherein the setting associated with the electronic part comprises one or more selected from among: an encryption setting, a cooling setting, a virtualization setting, or a power management setting.

14. The electronic device of claim 1, wherein the controller is to:

receive an updated target program representation that indicates a different version of the program for the electronic part; and store the updated target program representation in the storage medium.

15. The electronic device of claim 1, wherein the target program representation is signed, and wherein the controller is to:

validate the target program representation using a first key from a security key hierarchy stored in a memory of the electronic device.

16. The electronic device of claim 15, wherein the program is signed, and wherein the controller is to:

validate the program using a second key from the security key hierarchy.

17. A non-transitory machine-readable storage medium comprising instructions that upon execution cause a controller to:

store a target program representation in a storage medium, the target program representation comprising program version information identifying a program version for a program of an electronic part in an electronic device;

obtain a certificate issued by a certificate authority, the certificate separate from the target program representation and comprising a program version enforcement information element (IE) to indicate whether program version enforcement is to be applied using the target program representation;

check the program version enforcement IE in the certificate to determine whether the program version enforcement is to be applied, wherein the program version enforcement IE if set to a first value indicates that the program version enforcement is not to be applied using the target program representation, and the program version enforcement IE if set to a second value indicates that the program version enforcement is to be applied using the target program representation; and based on determining from the certificate that the program version enforcement is to be applied responsive to the program version enforcement IE in the certificate being set to the second value, enforce application of the program version of the program identified by the program version information to the electronic part.

18. The non-transitory machine-readable storage medium of claim 17, wherein the program version enforcement IE comprises a value in an object identifier (OID) of the certificate.

19. A method comprising:

storing, by a controller, a target program representation in a storage medium, the target program representation comprising program version information identifying a program version for a program of an electronic part in an electronic device;

obtaining, by the controller, a certificate issued by a certificate authority, the certificate separate from the target program representation and comprising a program version enforcement information element (IE) to indicate whether program version enforcement is to be applied using the target program representation;

checking, by the controller, the program version enforcement IE in the certificate to determine whether the program version enforcement is to be applied, wherein the program version enforcement IE if set to a first value indicates that the program version enforcement is not to be applied using the target program representation, and the program version enforcement IE if set to a second value indicates that the program version enforcement is to be applied using the target program representation; and based on determining from the certificate that the program version enforcement is to be applied responsive to the program version enforcement IE in the certificate being set to the second value, determining, by the controller, whether an installed version of the program for the electronic part is consistent with the program version of the program identified by the program version information, and based on determining that the installed version of the program for the electronic part is not consistent with the program version of the program identified by the program version information, replacing, by the controller, the installed version of the program with the program version of the program identified by the program version information.

20. The method of claim 19, wherein the target program representation further comprises program version information identifying a program version for a second program of a second electronic part in the electronic device, and the method further comprises:

obtaining, by the controller, a second certificate issued by the certificate authority for the second program, the second certificate comprising a program version enforcement IE set to the first value to indicate that program version enforcement for the second program is not to be applied using the target program representation; and based on determining from the second certificate that the program version enforcement for the second program is not to be applied responsive to the program version enforcement IE in the second certificate being set to the first value, declining, by the controller, to use the target program representation for the second program.

* * * * *